United States Patent
Boyd et al.

(10) Patent No.: US 7,689,392 B2
(45) Date of Patent: *Mar. 30, 2010

(54) METHOD AND APPARATUS FOR CONTROLLING A VEHICLE COMPUTER MODEL

(75) Inventors: Kenneth Boyd, Ann Arbor, MI (US); Joseph Neal, Detroit, MI (US); Eric Tseng, Canton, MI (US)

(73) Assignees: Ford Motor Company, Dearborn, MI (US); Ford Global Technologies, Dearborn, MI (US)

( * ) Notice: Subject to any disclaimer, the term of this patent is extended or adjusted under 35 U.S.C. 154(b) by 1249 days.

This patent is subject to a terminal disclaimer.

(21) Appl. No.: 10/707,365

(22) Filed: Dec. 9, 2003

(65) Prior Publication Data

US 2005/0125206 A1    Jun. 9, 2005

(51) Int. Cl.
  *G06G 7/48* (2006.01)
(52) U.S. Cl. ........................................ 703/8
(58) Field of Classification Search ............. 703/8, 703/7; 701/41; 180/204, 6.2, 6.24, 6.26, 180/6.28; 434/62–64

See application file for complete search history.

(56) References Cited

U.S. PATENT DOCUMENTS

| | | | |
|---|---|---|---|
| 4,679,808 A | | 7/1987 | Ito et al. |
| 5,373,911 A | * | 12/1994 | Yasui ................ 180/168 |
| 5,471,388 A | | 11/1995 | Zomotor et al. |
| 5,694,321 A | | 12/1997 | Eckert et al. |
| 5,774,819 A | | 6/1998 | Yamamoto et al. |
| 5,842,754 A | * | 12/1998 | Sano .................. 303/147 |
| 5,979,581 A | * | 11/1999 | Ravani et al. ........... 180/168 |
| 6,205,391 B1 | * | 3/2001 | Ghoneim et al. .......... 701/70 |
| 6,449,542 B1 | | 9/2002 | Bottiger et al. |
| 6,615,124 B1 | * | 9/2003 | Adachi .................. 701/70 |
| 6,789,017 B2 | * | 9/2004 | Aanen et al. ............ 701/41 |

(Continued)

FOREIGN PATENT DOCUMENTS

JP    07320188 A    * 12/1995

OTHER PUBLICATIONS

Sharp, R.S. et al. "Optimal Preview Car Steering Control." Vehicle System Dynamics 2001.*

(Continued)

*Primary Examiner*—Hugh Jones
(74) *Attorney, Agent, or Firm*—Angela M. Brunetti; Fredrick Owens

(57) ABSTRACT

A simulation system (30) for simulating an operation of an automotive vehicle includes an input (34) providing vehicle information and path information and a controller (38) having a vehicle computer model therein. The controller (38) is programmed to determine an initial steering wheel angle input to the computer model; determine a first steering wheel angle input to the computer model at a time later than the initial steering wheel angle input by comparing a look ahead point and an intended path; when the vehicle model is understeering, operate the computer model with the initial steering wheel angle input until an error of the first steering wheel angle and the initial is decreasing; when the error decreases, operate the computer model with the first steering wheel angle input; and generate an output in response to the vehicle model and the initial steering wheel input or the first steering wheel input.

23 Claims, 4 Drawing Sheets

U.S. PATENT DOCUMENTS

| | | | |
|---|---|---|---|
| 6,859,713 B2 * | 2/2005 | Pallot | 701/72 |
| 7,062,382 B2 * | 6/2006 | Courtenay et al. | 701/301 |
| 7,104,617 B2 * | 9/2006 | Brown | 303/152 |
| 2002/0108805 A1 | 8/2002 | Card | |

OTHER PUBLICATIONS

Kosecka, J. et al. Vision-Based Lateral Control of Vehicles. University of California at Berkeley. 2001.*

Fujiwara, Yukihiro et al. "Automated Steering Control System Design for Passenger Vehicle in Consideration of Steering Actuator Dynamics." Proceedings of the American Control Conference. May 2002.*

Krautstrunk, Alexander et al. "Fault Tolerant Force Feedback Actuator for Steer-By-Wire." Mechatronics 2000.*

Tan, Han-Shue et al. "Development of an Automated Steerig Vehicle Based on Roadway Magnets—A Case Study of Mechatronic System Design." IEEE/ASME Transactions on Mechatronics, vol. 4 No. 3. Sep. 1999.*

Hiraoka, Toshihio et al. "Cooperative Steering System Based on Vehicle Sideslip Angle Estimation from Side Acceleration Data at Percussion Centers." IEEE Vehicle Electronics Conference 2001.*

Al-Shihabi, Talal et al. "A Framework for Modeling Human-like Driving Behaviors for Autonomous Vehicles in Driving Simulators." AGENTS'01 ACM 2001.*

Feng, Kai-Ten et al. "Design of Vehicle Lateral Guidance System for Driver Assistance." Proceedings of the American Control Conference. Jun. 2000.*

Jia, Yingmin. "Robust Control with Decoupling Performance for Steering and Traction of 4WS Vehicles under Velocity-Varying Motion." IEEE Transactions on Control Systems Technology. vol. 8, No. 3. May 2000.*

Taylor, Camillo J. et al. "A Comparative Study of Vision-Based Lateral Control Strategies for Autonomous Highway Driving." The International Journal of Robotics Research, vol. 18, No. 5, May 1999. pp. 442-453.*

Modern Automotive Technology by James E. Duggy, 2000; pp. 1391-1394.

* cited by examiner

METHOD AND APPARATUS FOR CONTROLLING A VEHICLE COMPUTER MODEL

CROSS REFERENCE TO RELATED APPLICATIONS

The present invention is related to U.S. application Ser. Nos. 10/707,368 entitled "Method And Apparatus For Controlling A Vehicle Computer Model In An Aggressive Limit-Seeking Manner", and 10/707,366 entitled "Method And Apparatus For Controlling A Vehicle Computer Model With Understeer", filed simultaneously herewith.

BACKGROUND OF INVENTION

The present application relates generally to computer models that test the dynamics of an automotive vehicle, and more particularly, to a method for operating a vehicle model in an aggressive or limit-seeking manner with oversteer.

In the development of automotive vehicles, computer vehicle models are often used to test various designs. The various designs may be used to efficiently assess the handling of the vehicle using various parameters.

Current algorithms for computer driving control of computer vehicle models are designed to efficiently follow a given path. That is, the given path is accurately followed to provide minimal loss of speed due to side slipping of the computer vehicle model. Typically, such systems use a simulated look ahead of a driver to determine whether the vehicle is on the desired path. This is illustrated in step 10. In step 12 it is determined whether or not the vehicle is on target or on the desired path. If the computer vehicle model is on the desired path, step 14 is executed in which no change in the steering wheel angle is provided. The system then continues to step 16 in which the next time increment of the model is provided.

Referring back to step 12, if the vehicle is not on its intended path or "on target", step 18 is executed in which a new steering wheel angle (SWA) based on the size of the error between the look ahead path and the intended path is determined. In step 20 the computer model responds to the new steering wheel angle.

One problem with current computer vehicle models is that they are not typically designed to test the limits of control of the vehicle.

It would be desirable to be able to test the vehicle at aggressive or limit-seeking driving conditions. Typically, the computer model produces undesirable results that do not simulate real world driving when pushed to its limits. Typically, computer models generate undesirable steering wheel angles to compensate for variations in the desired path. The results are therefore not usable in the assessment of vehicle handling for such events. Therefore, it would be desirable to provide meaningful results when the vehicle model is driven aggressively, driven with understeer or oversteer.

SUMMARY OF INVENTION

The present invention allows a vehicle computer model to be driven near its limits to allow vehicle designers to assess the vehicle handling.

In one aspect of the invention, a method of operating a vehicle computer model having vehicle information and path information therein includes the steps of determining a plurality of current steering wheel angle inputs to the computer model by comparing a look ahead point and an intended path at various times; determining when the vehicle model is understeering in response to a yaw acceleration; when the vehicle model is understeering, holding the steering wheel angle to a first steering wheel angle input of the plurality of current steering wheel angles until an error determined as a function of the plurality of steering wheel angle inputs is decreasing; and when the error decreases, operating the computer model with the one of the plurality of current steering wheel angle inputs subsequent to the first steering wheel angle input.

In a further aspect of the invention, a simulation system for simulating an operation of an automotive vehicle includes an input providing vehicle information and path information and a controller having a vehicle computer model therein. The controller is programmed to determine an initial steering wheel angle input to the computer model; determine a first steering wheel angle input to the computer model at a time later than the initial steering wheel angle input by comparing a look ahead point and an intended path; when the vehicle model is understeering, operate the computer model with the initial steering wheel angle input until an error of the first steering wheel angle and the initial is decreasing; when the error decreases, operate the computer model with the first steering wheel angle input; and generate an output in response to the vehicle model and the initial steering wheel input or the first steering wheel input.

One advantage of the invention is that useful information may be obtained from vehicle models to allow vehicle designers to assess various vehicle designs in various limit-seeking and aggressive maneuvers. This, advantageously, will reduce the overall costs of development of the vehicle. That is, if more accurate information can be obtained using vehicle models, fewer prototypes will be built to test various designs.

Other advantages and features of the present invention will become apparent when viewed in light of the detailed description of the preferred embodiment when taken in conjunction with the attached drawings and appended claims.

DETAILED DESCRIPTION

In the following figures a vehicle computer model is described. The computer model may be run on various types of computers, including main frames or personal computers. The present system, as described below, may be used in aggressive limit-seeking manners. The system may be used when the vehicle is in an understeering condition. Vehicle understeering occurs when the front of the vehicle is plowing. That is, understeering is when the vehicle does not respond to a change in the steering wheel angle.

Oversteering is when the rear of the vehicle fishtails or slips out laterally relative to the front of the vehicle.

Figure 1:
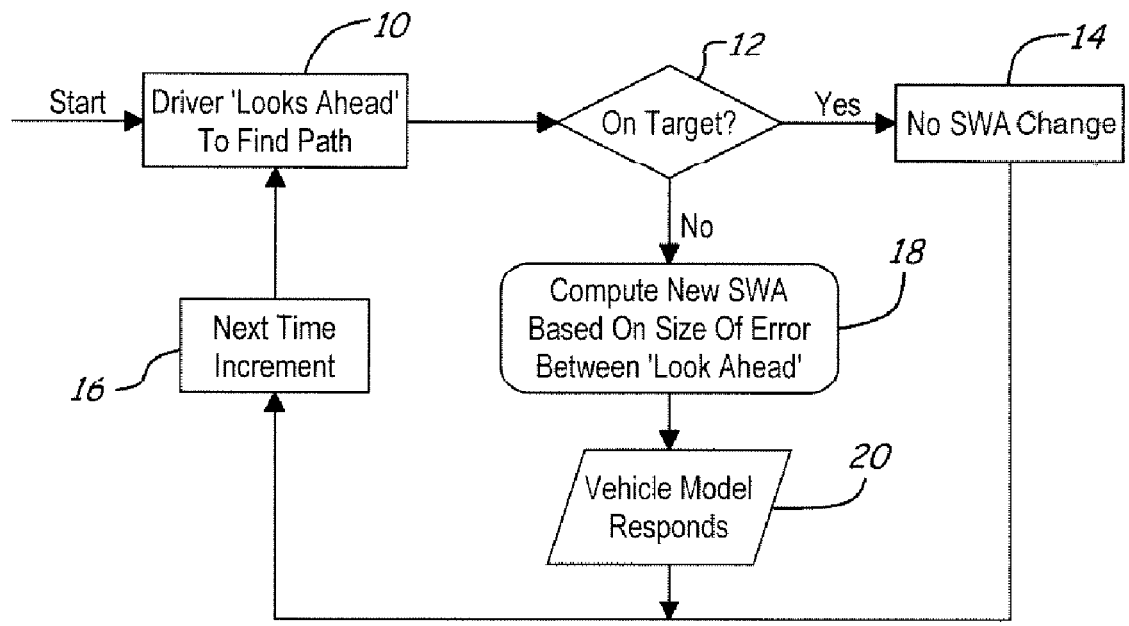
FIG. 1 is a flow chart illustrating the operation of a prior art vehicle computer model.
Figure 2:
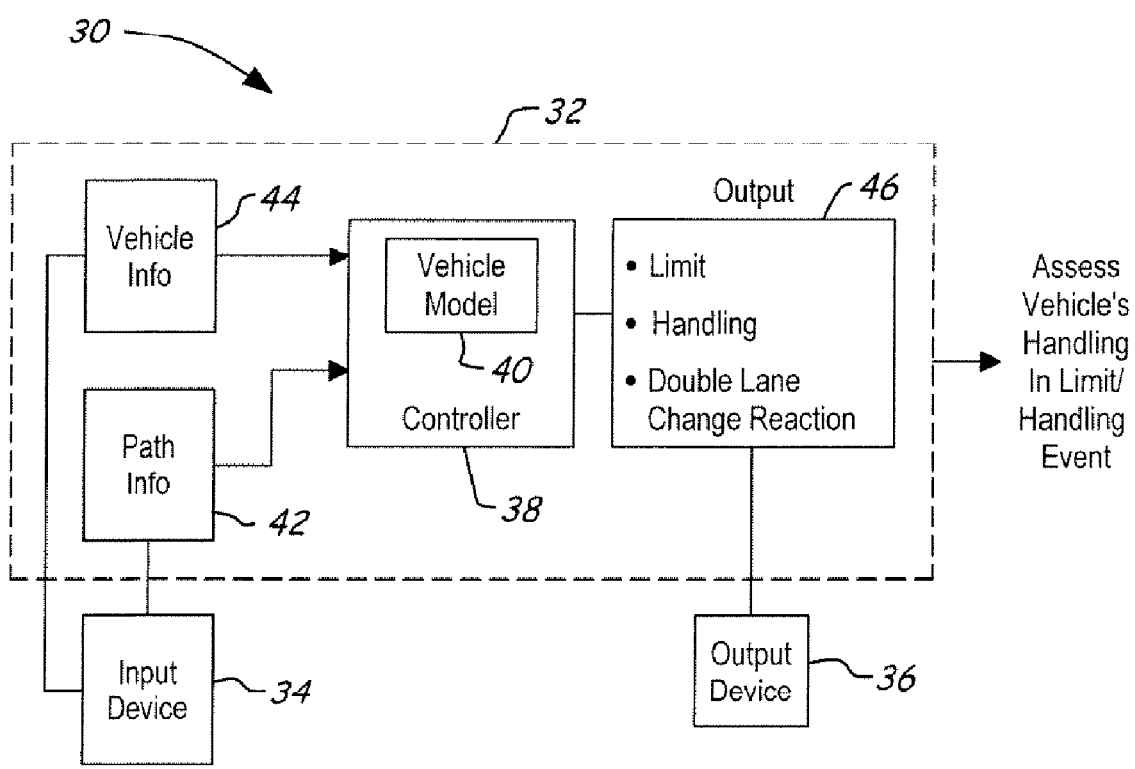
FIG. 2 is a block diagrammatic view of a simulation system for operating a vehicle model on a computer driven path.

Referring now to FIG. 2, a simulation system 30 is illustrated. Simulation system 30 has a computer 32 that has an input device 34 and an output device 36 coupled thereto. Computer 32 may be various types of computers including a main frame computer, a personal computer, or a network personal computer. Input device 34 may include various types of input devices for inputting various information such as a keyboard, a mouse, or a trackball, or other types of information such as complete files as in a CD-ROM or other information stored within a memory.

Output device 36 may include various types of output devices including a screen display, printer output or file outputs such as a disk drive or CD-ROM drive. Of course, various combinations of input devices 34 and output devices 36 may be used in various commercial embodiments.

Computer 32 includes a controller 38 that is used to control a simulation using vehicle model 40. Vehicle model 40 may be manually input or selectively input using various input devices 34. Information such as a desired path information 42 or vehicle information 44 such as dynamic control information may be input using at least one of the input devices 34. The input device 34 may also initiate the operation of the vehicle simulation and input the desired path or changes in the desired path.

The controller 38 generates an output that may be provided to output device 36. Output 46 may include various limits, handling, reactions to double lane changes or the like. The various information provided by output 46 may be used to assess the vehicle's handling in aggressive driving and limit situations.

Figure 3:
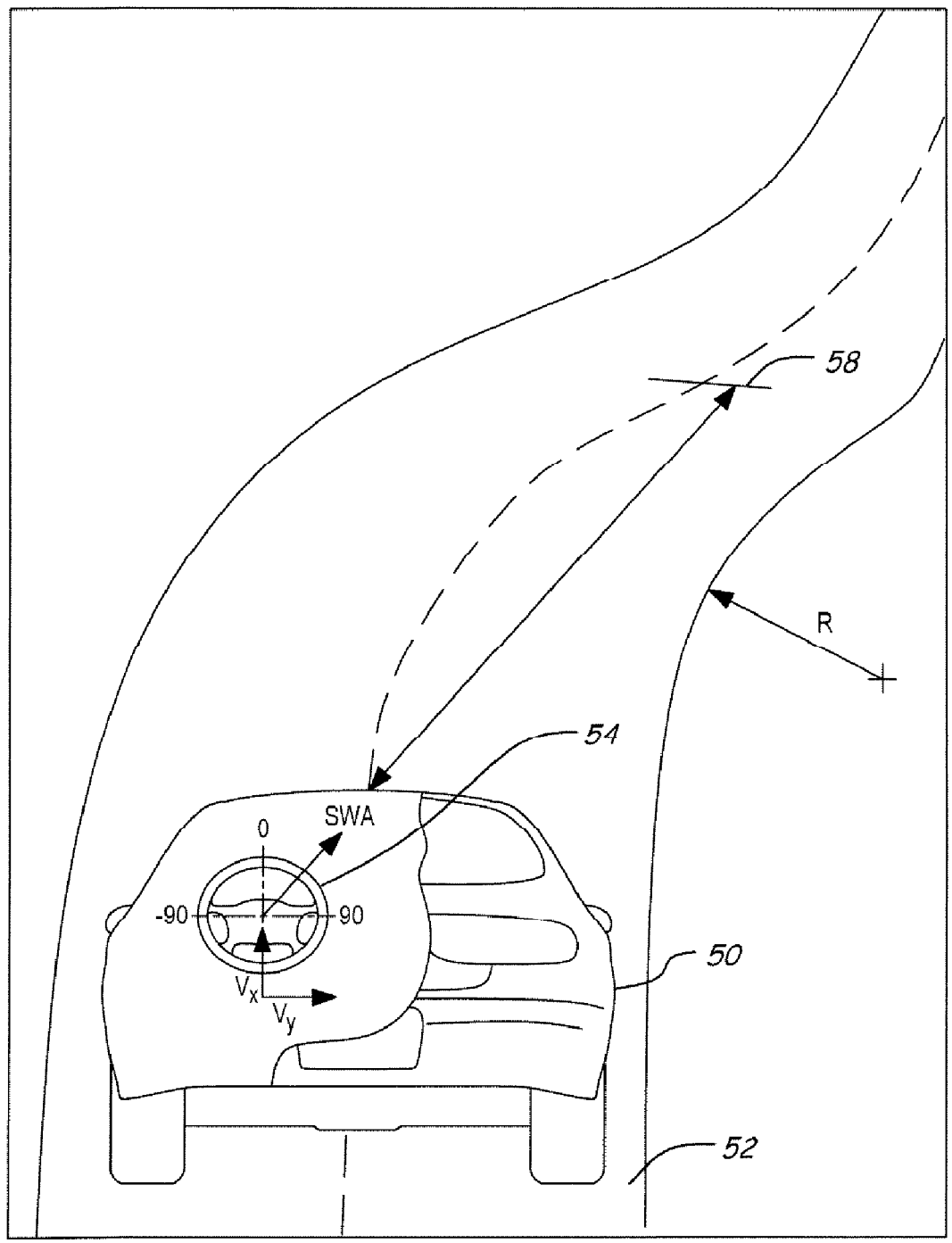
FIG. 3 is a diagrammatic view of a vehicle on a simulated road illustrating various dynamic conditions.

In FIG. 3, a representation of a vehicle 50 on a road surface corresponding to a path 52 is illustrated. FIG. 3 may represent a screen display. However, in an actual simulation a screen display may not actually be used. FIG. 3 is intended to provide a visual representation of some of the variables used in the vehicle model as described below. For example, the vehicle has a steering wheel 54 that is controlled by the computer model to traverse the intended path. The steering wheel 54 thus has a steering wheel angle (SWA). Typically, the steering wheel angle is measured from zero to a plus or minus angular direction.

The path 52 has a curvature with a radius represented by R. The vehicle model also includes a look ahead point 58 that has a look ahead distance which is the distance that the model looks ahead in order to determine the desired steering wheel angle of the vehicle as will be described below. Also, as further described below, the look ahead distance may be variable as opposed to fixed as in prior art vehicle models.

Also illustrated is a longitudinal vehicle velocity $V_x$ and a lateral vehicle velocity $V_y$. The longitudinal vehicle velocity and lateral vehicle velocity may be measured at different points on the vehicle including the front and/or the rear. The side slip angle is the inverse tangent of the ratio of the lateral vehicle velocity and the longitudinal vehicle velocity.

Figure 4:
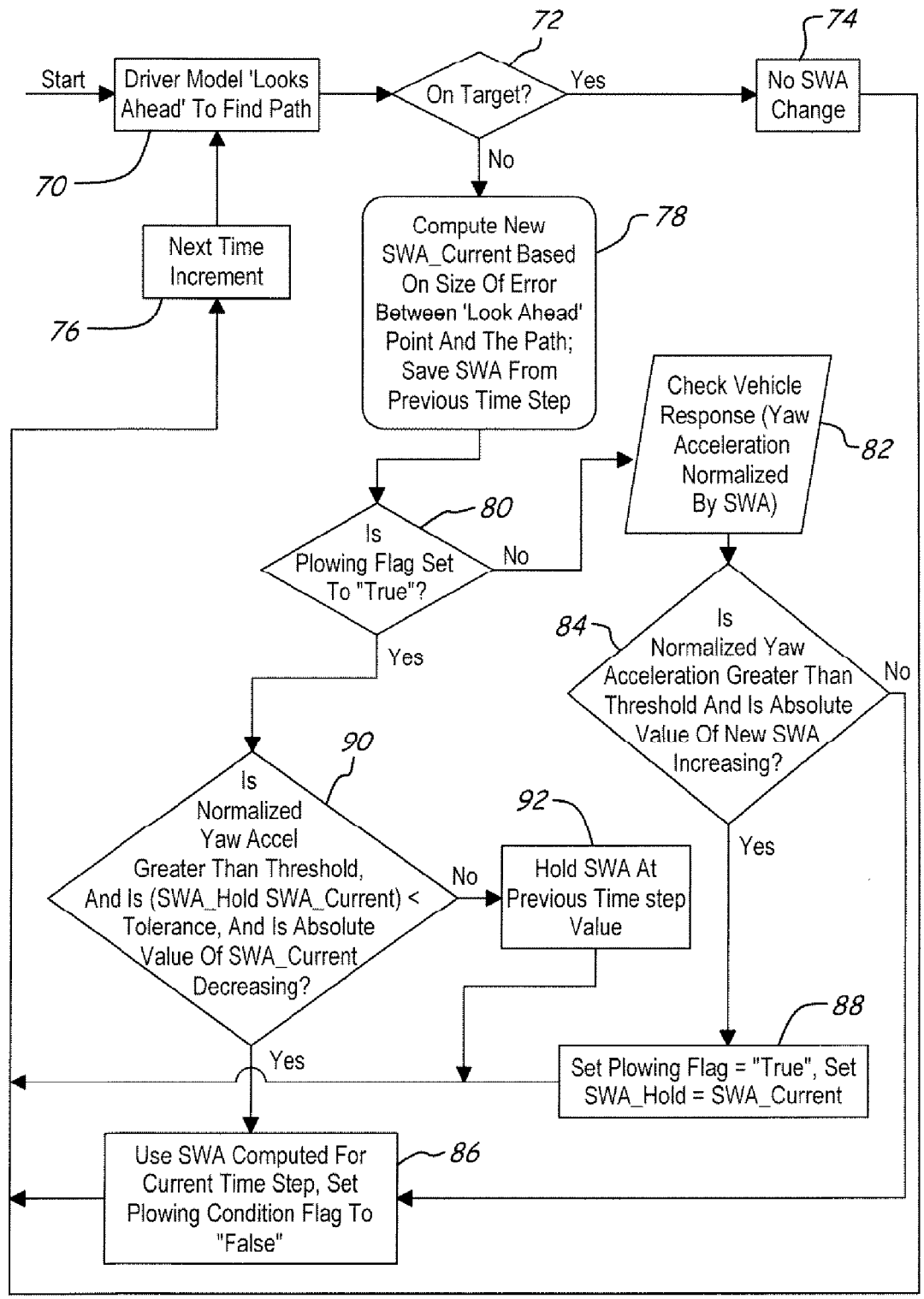
FIG. 4 is a flow chart of a vehicle computer model in an understeering condition.

Referring now to FIG. 4, a method of controlling a vehicle model in understeer is illustrated. In step 70, the driver model looks ahead to find the vehicle path 52. If the vehicle is "on target", step 74 is executed. In step 72, the vehicle is "on target" if the vehicle will follow a desired path within the look ahead range. If the vehicle will follow the desired path based upon the steering wheel input and various other inputs to the vehicle, no steering wheel change is provided in step 74. In step 76, the time of the vehicle model is incremented and then step 70 is again executed. In step 78, a new current steering wheel angle (SWA_current) based on the size of the error between the look ahead point and the desired path is determined. In this step, a previous or initial steering wheel angle is determined from a previous loop, as will be described below. This step forms a plurality of periodically determined steering wheel angle values. If the vehicle is not understeering, step 82 is executed. In step 82, the vehicle response is determined. The vehicle response in this embodiment is determined by the yaw acceleration which is normalized by the steering wheel angle. Of course, those skilled in the art will recognize various types of vehicle responses may be used. In step 84, the vehicle response, such as the normalized yaw acceleration, is compared to a threshold. If the normalized yaw acceleration is greater than a threshold and the absolute value of the steering wheel angle from step 78 is not increasing, step 86 is executed in which the steering wheel angle computed in step 78 is used and the plowing condition flag is set to false. Then, step 76 is executed.

Referring back to step 84, if the normalized yaw acceleration is greater than a threshold and the absolute value of the new steering wheel angle is increasing, the plowing flag set to true in step 88 and the steering wheel angle hold value (SWA_hold) is set to the current wheel value determined in block 78. The system then continues to block 76.

Referring back to block 80, if the plowing flag is set to be true from a previous step, step 90 is executed. In step 90 it is determined whether the error between the intended path and the desired path is converging or being reduced. The error is determined as a function of the normalized yaw rate and the current steering wheel angle. More specifically, in step 90 the normalized yaw acceleration is compared to a threshold. If the normalized yaw acceleration is greater than the threshold and the difference of the SWA_hold and the SWA_current is less than a tolerance and the absolute value of the SWA_current is decreasing, the error is being reduced. If the error is not being reduced, step 92 is executed in which the steering wheel angle is held at the previous time step value. In step 90, if the error is being reduced as set by the above-mentioned conditions, the steering wheel computed for the current time step is used. Also, the plowing condition flag is set to false since the vehicle is no longer and minimally plowing at this point. That is, when the conditions in step 90 are true, the vehicle model is being brought back under control. As can be seen, the steering wheel angle is not allowed to be changed to provide an undesirable result as in previous models. Thus, the current SWA value is held (while being monitored in step 90) until the value when it is determined that the vehicle is plowing is reached.

Figure 5:
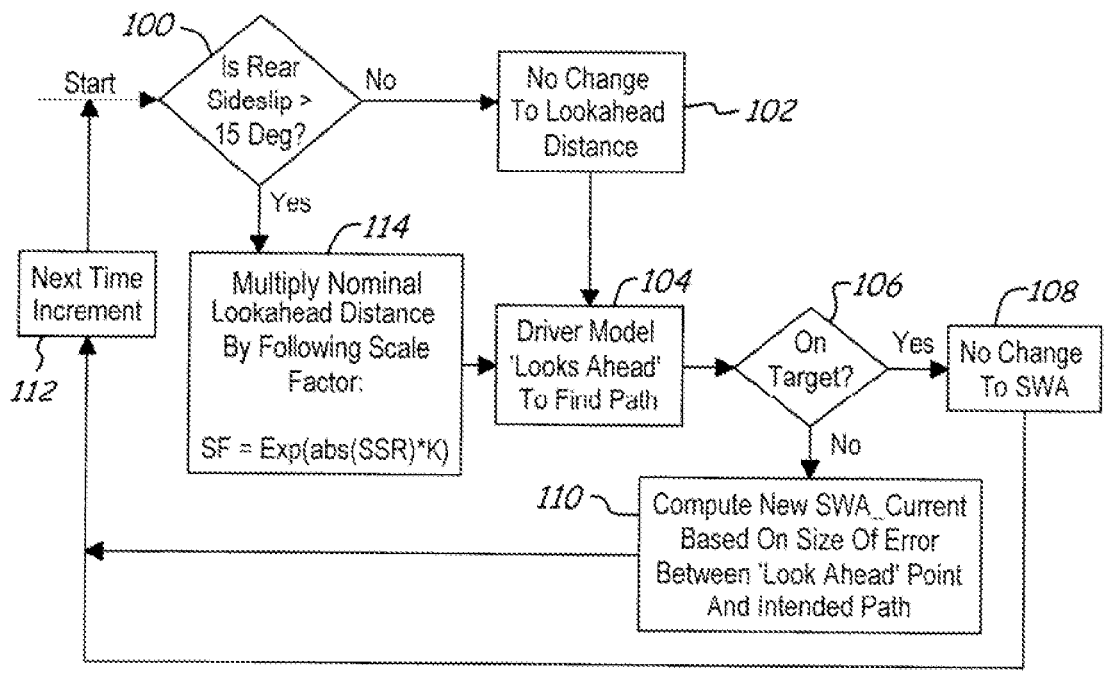
FIG. 5 is a flow chart illustrating a vehicle computer model in an oversteering condition.

Referring now to FIG. 5, a method for operating the vehicle model during oversteer is illustrated. In step 100, a rear side slip angle is determined. As mentioned above, the side slip angle is determined as function of the lateral vehicle velocity and the longitudinal vehicle velocity. The present system compares the rear side slip angle to a threshold such as 15° as is used in the present invention. If the rear side slip angle is not above 15°, step 102 is executed in which no change to the look ahead distance of the vehicle model is performed. That is, an unscaled look ahead factor is used. The system continues in step 104 in which the vehicle model is operated with the look ahead path. In step 106, if the vehicle is on the look ahead path, no steering wheel angle change is performed in step 108.

Referring back to step 106, if the vehicle is not on target, step 110 is executed in which a new steering wheel angle (SWA_current) is determined based on the size of the error between the look ahead point and the intended path. After step 108 and 110, step 112 is executed in which the next time increment is provided to the vehicle model. Referring back to step 100, if the rear side slip angle is greater than the threshold (which in this case is 15°), step 114 is executed. In step 114, the look ahead distance is increased by a scale factor (SF). In the present example, a scale factor is determined that is exponential in value. That is, the absolute value of the rear side slip angle (SSR) is multiplied by a constant (K), such as 0.02. This scale factor will be multiplied by the look ahead distance to increase the look ahead distance of the vehicle model. The new look ahead distance is used in step 104 to find the path. By providing the increased look ahead distance, the vehicle computer model generates useful results.

Figure 6:
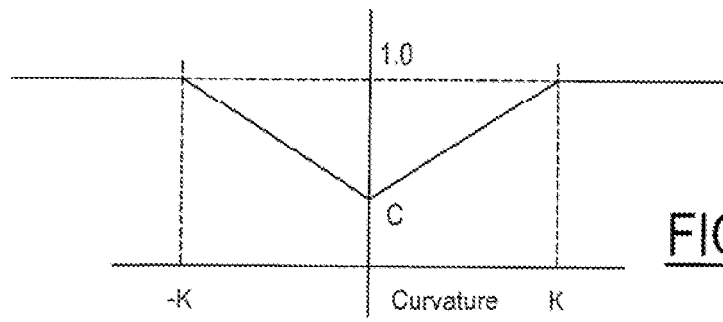
FIG. 6 is a plot of a look ahead scale factor versus curvature.
Figure 7:
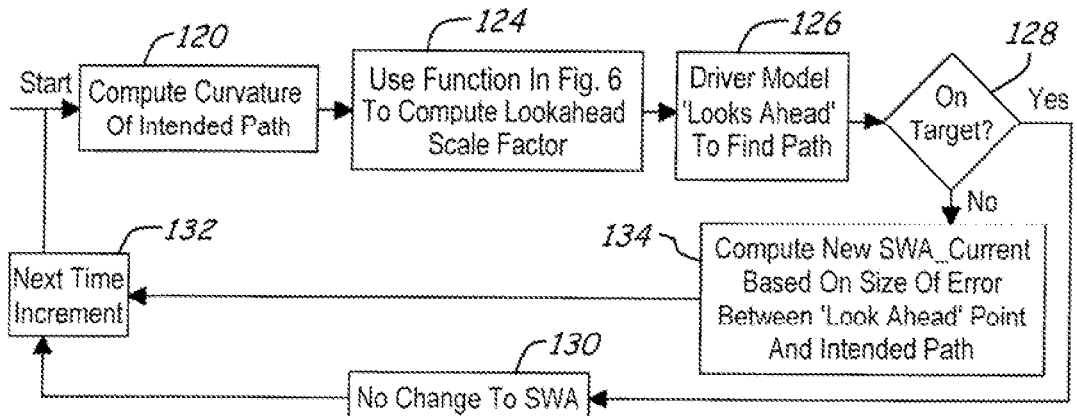
FIG. 7 is a flow chart of a vehicle computer model in an aggressive driving situation using the look ahead scale factor of FIG. 6.

Referring now to FIGS. 6 and 7, a method for controlling the vehicle model during aggressive maneuvers is illustrated. The look ahead scale factor is changed as the function illustrated in FIG. 6. That is, the look ahead scale factor is normally 1. However, during a straight driving condition, the look ahead scale factor is reduced to 62½ percent or 0.625 of the nominal look ahead scale factor. The scale factor increases as a function of the curvature of the road. Thus, as the curvature of the path increases, the look ahead scale factor also increases. In the present example, the look ahead scale factor is directly proportional (has a slope corresponding) to the curvature of the path. However, those skilled in the art will recognize that various curves may also be used depending on the vehicle. It should be noted that the curvature changes as a function of a negative and positive curvature of the path.

In FIG. 7, step 120 computes the curvature of the intended path. In step 124, the function of FIG. 6 is used to compute the look ahead scale factor. In step 126 the driver model uses the look ahead scale factor to determine the path of the vehicle. In step 128 if the vehicle is on target no change in steering wheel angle is commanded for the computer model. After step 130, step 132 increments the system to the next time.

Referring back to step 128, if the vehicle is not on target, step 134 is executed in which the current steering wheel angle is based on the size of the error between the look ahead point and the intended path. This keeps in mind that the intended path may have been increased or decreased by the look ahead scale factor in step 124. After step 134, step 132 is again executed.

As can be seen, the present invention allows the vehicle model to be controlled in various conditions such as understeering or oversteering and aggressive driving. This will allow vehicle designers to more quickly and readily determine how the vehicle handling reacts to various handling events.

While particular embodiments of the invention have been shown and described, numerous variations and alternate embodiments will occur to those skilled in the art. Accordingly, it is intended that the invention be limited only in terms of the appended claims.

The invention claimed is:

1. A simulation system for simulating operation of an automotive vehicle, particularly operating in at least one period of intentionally induced understeer, said simulation system comprising:
   (i) an input device for providing vehicle information and path information; and
   (ii) a controller coupled to said input device and operable to simulate said automotive vehicle using a vehicle computer model, wherein said controller is programmed to:
   (a) determine an initial steering wheel angle that is input to said vehicle computer model;
   (b) determine a new steering wheel angle, which is input to said vehicle computer model at a time later than said initial steering wheel angle, by comparing an intended vehicle path with a look ahead point on said intended vehicle path;
   (c) determine whether said vehicle computer model is understeering due to the front of said vehicle computer model plowing or slipping substantially forward by a predetermined vehicle response threshold in response to said new steering wheel angle;
   (d) when said vehicle computer model is determined to be understeering, operate said vehicle computer model with said initial steering wheel angle until a new steering wheel angle is determined such that said plowing or slipping substantially forward is thereby reduced;
   (e) when said plowing or slipping substantially forward is reduced by a new steering wheel angle, operate said vehicle computer model with said new steering wheel angle; and
   (f) generate an output in response to said vehicle computer model and said initial steering wheel angle or said new steering wheel angle.

2. A simulation system as set forth in claim 1, wherein said simulation system further comprises and output device that is coupled to said controller, and said controller is operable to control said output device in response to said vehicle computer model and said initial steering wheel angle or said new steering wheel angle.

3. A simulation system as set forth in claim 1, wherein said vehicle computer model comprises a dynamic control model.

4. A simulation system as set forth in claim 1, wherein said controller is operable to determine an increasing steering wheel angle by comparing said initial steering wheel angle with said new steering wheel angle.

5. A simulation system as set forth in claim 1, wherein said controller is operable to determine a decreasing steering wheel angle by comparing said new steering wheel angle with said initial steering wheel angle or a previously determined new steering wheel angle, and said controller is operable to determine a reduction in said plowing or slipping substantially forward in response to said decreasing steering wheel angle.

6. A simulation system as set forth in claim 1, wherein both said initial steering wheel angle and said new steering wheel angle are referenced by said controller from a zero steering wheel angle defined at said front of said vehicle computer model, and said controller is operable to determine a reduction in said plowing or slipping substantially forward in response to a decrease in the absolute value of said new steering wheel angle as compared to said initial steering wheel angle or a previously determined new steering wheel angle.

7. A simulation system as set forth in claim 1, wherein both said initial steering wheel angle and each said new steering wheel angle are referenced by said controller from a zero steering wheel angle defined at said front of said vehicle computer model, and said controller is operable to determine when said vehicle computer model is plowing or slipping substantially forward in response to (i) a determined yaw acceleration being greater than a predetermined threshold and (ii) a determined increase in the absolute value of said new steering wheel angle as compared to said initial steering wheel angle or a previously determined new steering wheel angle.

8. A simulation system as set forth in claim 1, wherein said controller is operable to determine the steering wheel angle difference between said new steering wheel angle and said initial steering wheel angle or a previously determined new steering wheel angle, and said controller is operable to determine a reduction in said plowing or slipping substantially forward if said steering wheel angle difference is less than a predetermined tolerance.

9. A method of operating a vehicle computer model having vehicle information and path information therein the vehicle computer model operating with at least one occurrence of intentionally induced understeer, said method being operable on a digital computer system and comprising the steps of:
(a) determining an initial steering wheel angle that is input to said vehicle computer model;
(b) determining a new steering wheel angle, which is input to said vehicle computer model at a time later than said initial steering wheel angle, by comparing an intended vehicle path with a look ahead point on said intended vehicle path;
(c) determining whether said vehicle computer model is understeering due to the front of said vehicle computer model plowing or slipping substantially forward in response to said new steering wheel angle;
(d) determining whether said vehicle computer model is plowing or slipping substantially forward based on whether a yaw acceleration is greater than a predetermined threshold and also whether said new steering wheel angle is greater than said initial steering wheel angle or a previously determined new steering wheel angle;
(e) when said vehicle computer model is determined to be understeering, operating said vehicle computer model with said initial steering wheel angle until a new steering wheel angle is determined such that said plowing or slipping substantially forward is thereby reduced;
(f) when said plowing or slipping substantially forward is reduced by a new steering wheel angle, operating said vehicle computer model with said new steering wheel angle; and
(g) generating an output in response to said vehicle computer model and said initial steering wheel angle or said new steering wheel angle.

10. A method as set forth in claim 9, wherein step (d) is at least partially accomplished by comparing said initial steering wheel angle with said new steering wheel angle.

11. A method as set forth in claim 9, said method further comprising the steps of:
determining a decreasing steering wheel angle by comparing said new steering wheel angle with said initial steering wheel angle or a previously determined new steering wheel angle; and
operating said controller to determine a reduction in said plowing or slipping substantially forward in response to said decreasing steering wheel angle.

12. A method as set forth in claim 9, said method further comprising the steps of:
operating said controller so as to reference both said initial steering wheel angle and said new steering wheel angle from a zero steering wheel angle defined at said front of said vehicle computer model; and
operating said controller to determine a reduction in said plowing or slipping substantially forward in response to a decrease in the absolute value of said new steering wheel angle as compared to said initial steering wheel angle or a previously determined new steering wheel angle.

13. A method as set forth in claim 9, said method further comprising the steps of:
operating said controller so as to reference both said initial steering wheel angle and each said new steering wheel angle from a zero steering wheel angle defined at said front of said vehicle computer model; and
operating said controller to determine when said vehicle computer model is plowing or slipping substantially forward in response to (i) a determined yaw acceleration being greater than a predetermined threshold and (ii) a determined increase in the absolute value of said new steering wheel angle as compared to said initial steering wheel angle or a previously determined new steering wheel angle.

14. A method as set forth in claim 9, said method further comprising the steps of:
operating said controller to determine the steering wheel angle difference between said new steering wheel angle and said initial steering wheel angle or a previously determined new steering wheel angle; and
operating said controller to determine a reduction in said plowing or slipping substantially forward if said steering wheel angle difference is less than a predetermined tolerance.

15. A method of operating a vehicle computer model having vehicle information and path information therein the vehicle computer model operating with at least one occurrence of intentionally induced understeer, said method being operable on a digital computer system and comprising the steps of:
(a) determining a plurality of steering wheel angles, each associated with a different time stamp and input to said vehicle computer model, by comparing an intended vehicle path with a look ahead point on said intended vehicle path at various times;
(b) determining whether said vehicle computer model is understeering due to the front of said vehicle computer model plowing or slipping substantially forward in response to said plurality of steering wheel angles;
(c) determining whether said vehicle computer model is plowing or slipping substantially forward based on whether a yaw acceleration is greater than a predetermined threshold;
(d) when said vehicle computer model is determined to be understeering, operating said vehicle computer model at one of said plurality of steering wheel angles until a later one of said plurality of steering wheel angles is determined such that said plowing or slipping substantially forward is thereby reduced;
(e) when said plowing or slipping substantially forward is reduced by a later one of said plurality of steering wheel angles, operating said vehicle computer model with said later one of said plurality of steering wheel angles; and
(f) generating an output in response to said vehicle computer model and said later one of said plurality of steering wheel angles.

16. A method as set forth in claim 15, wherein step (a) is at least partially accomplished by determining said plurality of steering wheel angles periodically.

17. A method as set forth in claim 15, wherein said yaw acceleration is a normalized yaw acceleration.

18. A method as set forth in claim 17, wherein said normalized yaw acceleration is a steering wheel angle normalized yaw acceleration.

19. A method as set forth in claim 15, said method further comprising the step of providing said output to at least one output device selected from the group consisting of a computer screen, a computer printer, a computer disk drive, and a compact disc (CD) read-only memory (ROM) drive.

20. A method as set forth in claim 15, said method further comprising the steps of:
determining a decreasing steering wheel angle by comparing a later one of said plurality of steering wheel angles with an earlier one of said plurality of steering wheel angles; and operating said controller to determine a reduction in said plowing or slipping substantially forward in response to said decreasing steering wheel angle.

21. A method as set forth in claim 15, said method further comprising the steps of:

operating said controller so as to reference both an earlier one of said plurality of steering wheel angles and a later one of said plurality of steering wheel angles from a zero steering wheel angle defined at said front of said vehicle computer model; and operating said controller to determine a reduction in said plowing or slipping substantially forward in response to a decrease in the absolute value of said later one of said plurality of steering wheel angles as compared to said earlier one of said plurality of steering wheel angles.

22. A method as set forth in claim 15, said method further comprising the steps of:

operating said controller so as to reference both an earlier one of said plurality of steering wheel angles and a later one of said plurality of new steering wheel angles from a zero steering wheel angle defined at said front of said vehicle computer model; and operating said controller to determine whether said vehicle computer model is plowing or slipping substantially forward in response to a determined increase in the absolute value of said later one of said plurality of steering wheel angles as compared to said earlier one of said plurality of steering wheel angles.

23. A method as set forth in claim 15, said method further comprising the steps of:

operating said controller to determine the steering wheel angle difference between said later one of said plurality of steering wheel angles and said earlier one of said plurality of steering wheel angles; and operating said controller to determine a reduction in said plowing or slipping substantially forward if said steering wheel angle difference is less than a predetermined tolerance.

* * * * *